US006807563B1

(12) United States Patent
Christofferson et al.

(10) Patent No.: US 6,807,563 B1
(45) Date of Patent: Oct. 19, 2004

(54) AUTOMATIC TELECONFERENCING CONTROL SYSTEM

(75) Inventors: Frank C. Christofferson, Broomfield, CO (US); Edward M. Miller, Broomfield, CO (US)

(73) Assignee: Terayon Communications Systems, Inc., Santa Clara, CA (US)

(*) Notice: Subject to any disclaimer, the term of this patent is extended or adjusted under 35 U.S.C. 154(b) by 0 days.

(21) Appl. No.: 09/574,862

(22) Filed: May 20, 2000

Related U.S. Application Data

(63) Continuation-in-part of application No. 09/571,577, filed on May 15, 2000.
(60) Provisional application No. 60/204,438, filed on May 15, 2000, provisional application No. 60/139,616, filed on Jun. 17, 1999, and provisional application No. 60/135,239, filed on May 21, 1999.

(51) Int. Cl.[7] ............................................. G06F 13/00
(52) U.S. Cl. ...................... 709/204; 709/218; 709/225; 709/238
(58) Field of Search ............................... 709/204, 206, 709/207, 217, 218, 223, 225, 227, 238; 719/329

(56) References Cited

U.S. PATENT DOCUMENTS

| | | |
|---|---|---|
| 3,544,726 A | 12/1970 | Wimberly |
| 4,229,814 A | 10/1980 | Betts |
| 4,342,111 A | 7/1982 | Busson |
| 4,529,842 A | 7/1985 | Levy et al. |
| 4,937,856 A | 6/1990 | Natarajan |
| 5,103,444 A | 4/1992 | Leung et al. |
| 5,392,343 A * | 2/1995 | Davitt et al. ................. 379/212 |
| 5,440,624 A * | 8/1995 | Schoof, II .................... 379/202 |
| 5,483,588 A | 1/1996 | Eaton et al. |
| 5,619,555 A | 4/1997 | Fenton et al. |
| 5,689,553 A * | 11/1997 | Ahuja et al. ................. 379/202 |
| 5,699,352 A * | 12/1997 | Kriete et al. ................. 370/262 |
| 5,835,722 A | 11/1998 | Bradshaw et al. |
| 5,889,958 A | 3/1999 | Willens |
| 5,973,724 A | 10/1999 | Riddle |
| 5,978,467 A | 11/1999 | Walker et al. |
| 5,991,385 A | 11/1999 | Dunn et al. |
| 5,991,389 A | 11/1999 | Ram et al. |
| 6,049,341 A | 4/2000 | Mitchell et al. |
| 6,078,583 A * | 6/2000 | Takahara et al. ............ 370/356 |
| 6,088,435 A * | 7/2000 | Barber et al. ................ 379/205 |
| 6,282,278 B1 * | 8/2001 | Doganata et al. ........... 379/202 |
| 6,570,606 B1 * | 5/2003 | Sidhu et al. ................. 348/14.1 |

* cited by examiner

*Primary Examiner*—Viet D. Vu
(74) *Attorney, Agent, or Firm*—Whitham, Curtis & Christofferson, P.C.

(57) ABSTRACT

An automatic teleconferencing control system uses a trigger definition database to define trigger criteria and corresponding conference control commands for corresponding trigger functions. Trigger criteria may relate to configuration profiles set for each participant or to conference level policy decisions. Participant attribute changes and media flows among participant stations on a conference are analyzed in accordance with the trigger criteria, and when trigger criteria are identified a corresponding conference control command is issued.

40 Claims, 9 Drawing Sheets

AUTOMATIC TELECONFERENCING CONTROL SYSTEM

This patent application is a continuation in part of U.S. patent application Ser. No. 09/571,577 entitled "Teleconferencing Bridge with Edgepoint Mixing" filed on May 15, 2000, and also claims priority from: U.S. provisional application 60/139,616 of the same tide as the present application filed on Jun. 17, 1999; related U.S. provisional application 60/135,239 entitled "Teleconferencing Bridge With Edgepoint Mixing" filed on May 21, 1999; and U.S. provisional application 60/204,438 entitled "Conferencing System and Method" filed on May 15, 2000. The disclosures of the foregoing applications are incorporated herein by reference as if set forth in full text.

BACKGROUND OF THE INVENTION

1. Field of the Invention

The present invention relates generally to communication systems, and, more particularly, to controlling a media conference arrangement through a distributed automatic control network.

2. Background Description

In a communication network, it is desirable to provide conference arrangements whereby many customers can be bridged together on a media conference connection. A conference bridge is a device or system which allows several connection endpoints to be connected together to establish a communications conference. Communications conferences may include voice, video, and an assortment of other media streams.

Historically, each conferee in a dial-up conference arrangement is summoned at the appropriate time by establishing a communication path to the conferee's customer station. The conferee is informed that he or she is wanted for a conference call and then added to the bridge where the conferee can talk with the other conferees on the bridge. This type of an arrangement is under the control and supervision of an operator or attendant. The attendant can answer, add or disconnect individual conferees to the bridge with minimal interference to the other conferees connected. More recently, systems have allowed conferees to enter and leave a conference without a physical attendant's participation.

In the prior art, control of conference bridge operator functions such as deleting or intercepting a conferee was accomplished via manual operation via a console, which therefore restricted the implementation of optional functions to operations manually selectable by a human attendant operator. A need therefore exists to be able to create a virtual attendant with the ability to perform a multitude of operations without human cost or intervention.

SUMMARY OF THE INVENTION

It is therefore an object of the present invention to provide a conference bridge which performs optional functions automatically.

Another object of the invention is to provide a mechanism for pre-defining optional functions to be undertaken with respect to individual conference participants.

It is also an object of the invention to provide a mechanism for automatically invoking optional functions, based upon attributes set by a participant or upon content analysis of media flows distributed on a conference.

It is a further object of the invention to provide an automatic bridge controller which is extensible and scalable.

The invention automatically controls a teleconference by establishing a trigger definition database in accordance with participant profiles set up for each participant station. Participant stations are connected to a teleconference through a media bridge, and media flows originating from a participant station are distributed to other participants through the media bridge. Media flows (including changes in participant attributes, virtual positioning information, audio streams, etc.) are analyzed to determine whether trigger criteria defined in the trigger definition database are met. In identifying trigger criteria, a media flow is associated with a participant station and the trigger definition database is used to determine which trigger criteria are applicable to the participant station. When a trigger criteria is determined to have been met, a corresponding conference control command stored in the trigger definition database is issued, which executes an optional function without intervention of a human conference attendant.

The invention provides automatic control of conference bridges, enabling operator functions such as deleting or re-routing a conference attendee to occur based on pre-defined trigger criteria. These triggers may include—but are not restricted to—analysis of data content or context, receipt of participant-initiated conference controls or requests, or external conferencing policy decisions applicable to participant media streams. The invention, called the automatic bridge controller, including a trigger definition database, which preferably includes trigger functions, trigger criteria, and trigger control commands for describing the nature of the trigger to be detected as well as the action to be taken; a bridge analyzer, which performs the trigger functions, detects trigger criteria, and issues trigger control commands; and a bridge control protocol, in accordance with which the control commands are sent to the desired system element or elements.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
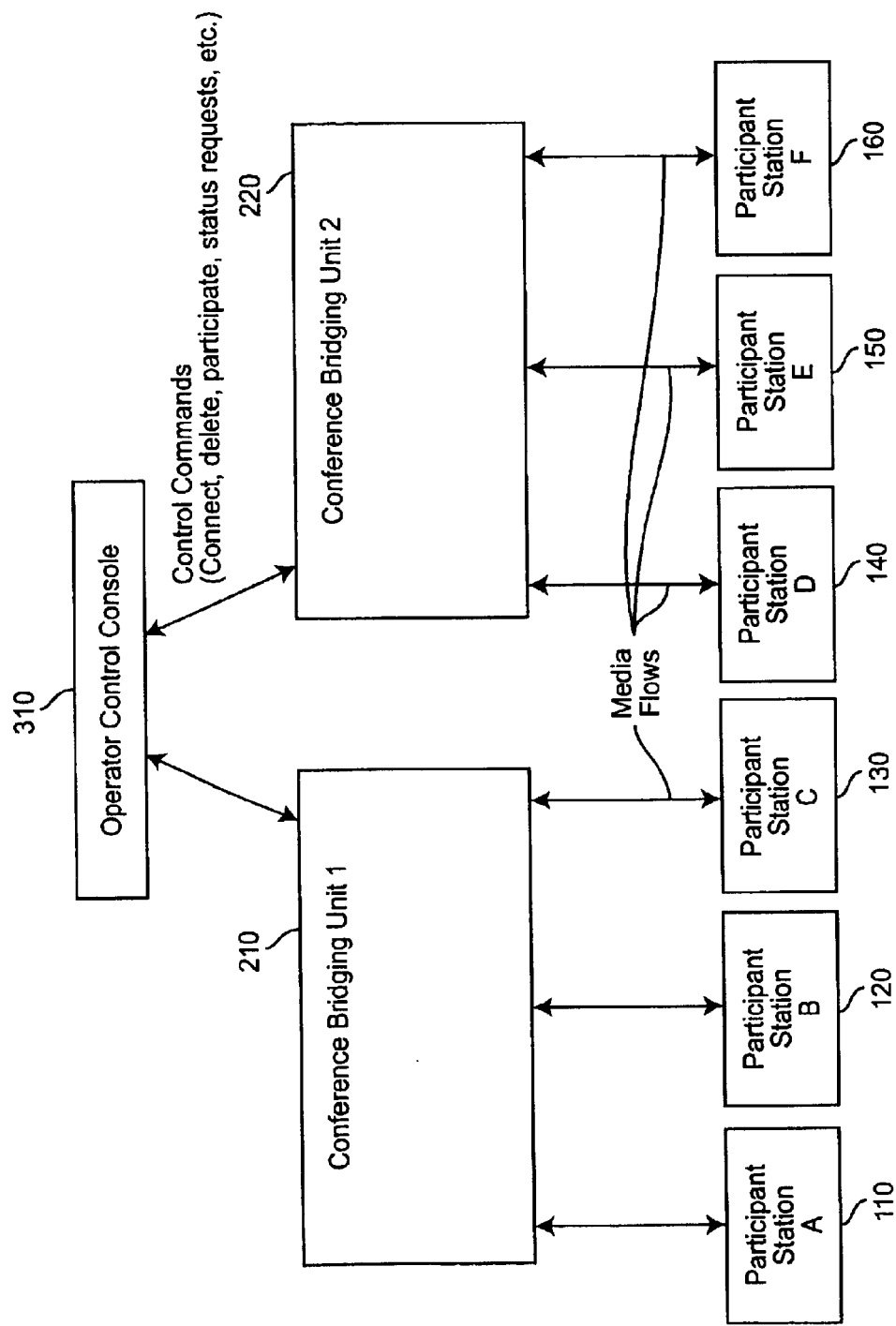
FIG. 1 shows a reference block diagram of generic bridged network with communications endpoints, media flows, conference bridging units, and an operator control console.

Referring now to the drawings, and more particularly to FIG. 1, there is shown the general organization of a system used for multi-party conferencing on a network. A number of conference participant stations, A 110, B 120, C 130, D 140, E 150, and F 160, are interfaced with conference bridging units 210 and 220. This is accomplished by standard conferencing multiplexing, or by the improved mechanisms described in related U.S. application Ser. No. 09/571,577 entitled "Teleconferencing Bridge with Edgepoint Mixing" filed May 15, 2000, previously incorporated herein by reference. The operator control console 310 is used to perform basic operations which control the conferences, including monitoring (passively participating) in a conference, manually connecting participant stations, manually deleting participant stations, and inquiring as to the status of each conference bridging unit. The media interface between the conference participant stations and the conference bridging unit may be over the public switched telephone network (PSTN), a packet switched network, or a combination of the two in which a PSTN to packet switched network gateway is traversed. It will be apparent to those skilled in the art that the participant stations may be connected to the conference bridging units via any suitable connection, including any wide area network, local area network, hard-switched networks, private communications networks, cellular networks, etc.

Preferably, the operator control console 310, conference bridging units 210, 220, automatic bridge controllers 410, 420, and media bridges 430, 440, are all software functions operating on appropriate hardware, such as a DSP platform or an Intel-based personal computer. In one embodiment, the conference bridging units are implemented as part of a system control unit as described in related U.S. application Ser. No. 09/571,577 entitled "Teleconferencing Bridge with Edgepoint Mixing" filed May 15, 2000. In this embodiment, the media bridges 430, 440 are implemented as audio bridging units as described in that Application, and the conference bridging units 210, 220 are implemented as part of the audio-conference bridging system described therein.

Basic operation of the system in a preferred embodiment is as follows. Conference participant stations 110, 120, and 130 independently establish a control session with a first conference bridging unit 210. Conference participant stations 140, 150, and 160 independently establish a control session with a second conference bridging unit 220. More or fewer conference bridging units can, of course, be employed if desired. The conference bridging units 210, 220, then connect the participant stations 110, 120, 130 in a first conference and participant stations 140, 150, and 160 in a second conference through their respective media bridges 430, 440. Once a participant station joins a conference, the media flows from that participant, and preferably all conference participants, are examined by the corresponding automatic bridge controller 410 or 420 to effect appropriate trigger functions. As will be discussed, trigger functions are dictated by the trigger control database. The management of the automatic bridge controllers 410, 420 in the network is performed by the operator control console 310, which maintains and distributes a master trigger definition database. Detailed examples of a trigger definition database, trigger functions, trigger criteria, and trigger control commands follow in subsequent figure descriptions, along with example distributed configurations of automatic bridge controllers and their sub-functions.

Figure 3:
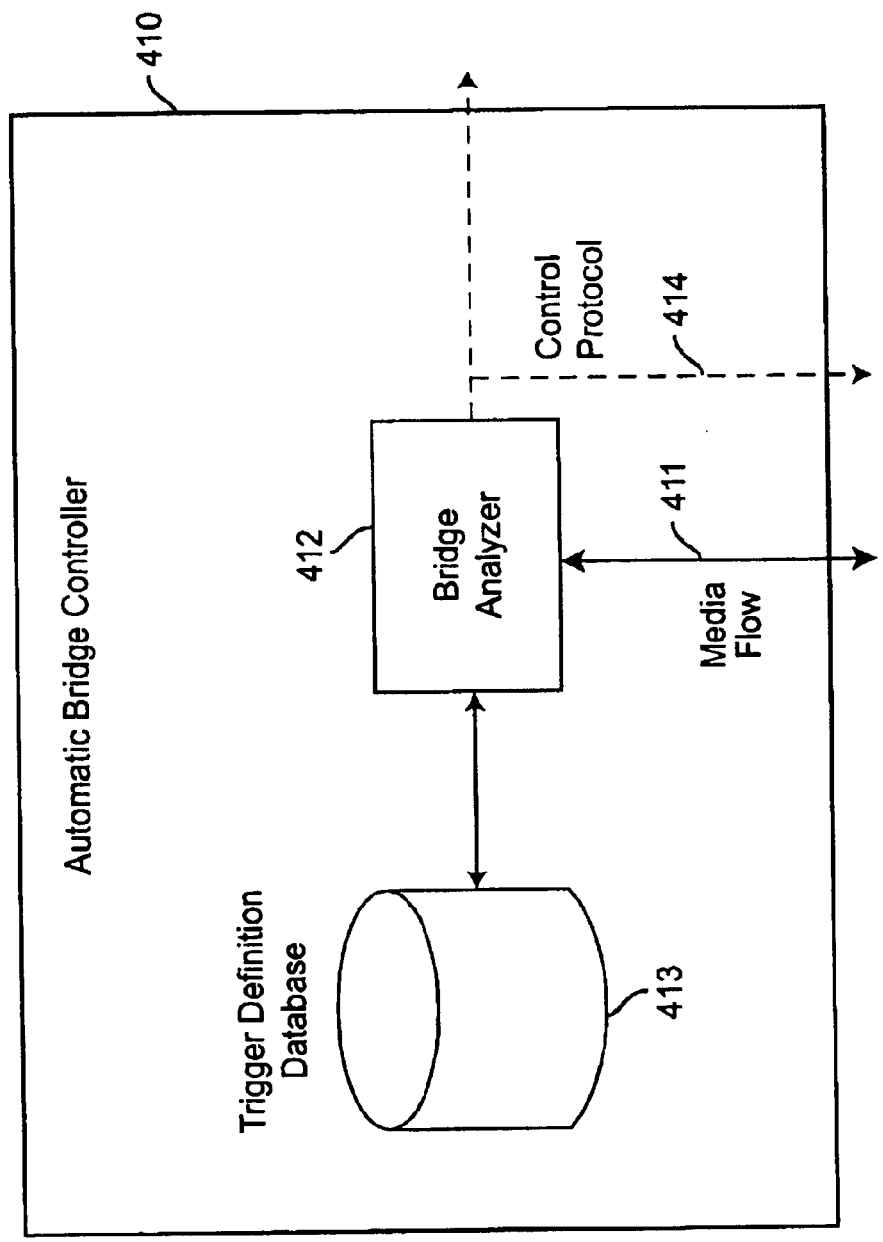
FIG. 3 shows a detailed block diagram of an automatic bridge controller of the present invention, with a separate trigger definition database, bridge analyzer, and controller control protocol.

FIG. 3 illustrates the sub-components of an automatic bridge controller 410. Media flows 411 from conference participant stations are examined and tested by a bridge analyzer 412 according to conditions established in the trigger definition database 413. As discussed, the trigger definition database may be maintained on the operator console 310 and simply downloaded as needed to particular conference bridging units as needed or may be completely distributed among conference bridging units. Specific example sets showing how triggering is accomplished at bridge analyzer 412 are described below in connection with FIGS. 4–6. If a trigger function is implemented, and trigger criteria established in trigger definition database 413 are met, trigger control commands are issued in accordance with control protocol 414 by signaling the appropriate command to the devices indicated in the database 413.

The sub-components and functions of the automatic bridge controller 410 are described below. Bridge controller 410 may be shared or distributed, as described in FIG. 7. The sub-components of an automatic bridge controller 410 may in turn be distributed, as described in FIG. 8. Each participant station in a conference is assigned to a corresponding automatic bridge controller 410, 420, etc., although many participant stations may be assigned to a single bridge controller.

In packet-switched conference environments, the media flow 411 can comprise embedded information of any data type. For example, audio packets may provide voice information for the conference. Video packets may provide video information. Other data packets may provide additional information, such as sub-application data (for example, collaborative document coordination information), or control information (such as shared display cursor information or virtual environment coordinate data).

In dedicated-switched voice conferencing systems, the media flow 411 may comprise audio information. Even in dedicated-switched environments, this audio information may be augmented by a separate communication channel of data, employed as described above in packet environments. These disparate flows can be coordinated through user selection of keys at conference initiation. For example, a user may proceed to a conference web site in order to obtain a conference ID and connection telephone number, after which point the user connects independently to the audio portion of the conference. This procedure is explained in greater detail in related U.S. application Ser. No. 91/571,577, entitled "Teleconference Bridge with Edgepoint Mixing," filed May 15, 2000, previously incorporated by reference herein. The participant preferably answers questions and provides a variety of information during the process of obtaining a conference ID, in accordance with the particular capabilities of the conference environment and requirements for implementing applicable triggers and control protocols specified in the trigger definition database. The automatic bridge controller thus obtains enough information from this process of obtaining a conference ID to coordinate the association of voice and other data in the conference.

The bridge analyzer 412 performs trigger functions to determine if trigger criteria are met and corresponding trigger control commands must be executed. The bridge analyzer can comprise a variety of trigger functions, depending on the current needs of the trigger definition database, described below. In a preferred embodiment, these functions are real-time programs which operate continuously on the input media flow or flows from one or more of the participant stations. However, some trigger functions may require only non real-time analysis, in which case computational resources may be employed during off-peak periods, reducing peak computational requirements and cost.

The trigger definition database 413 contains the information necessary to link tests on the participant stations' media flows to trigger control commands. The database is preferably optimized for real time analysis, minimizing and encoding test and action information. For example, bit-fields or bit-vectors are employed if implementation hardware can take advantage of them, and abbreviated phoneme codes may be stored to accelerate comparisons within speech recognition functions, and so on. The optimal form of the database will change as the functions needed are expanded, with corresponding optimized data entries.

Figure 4:
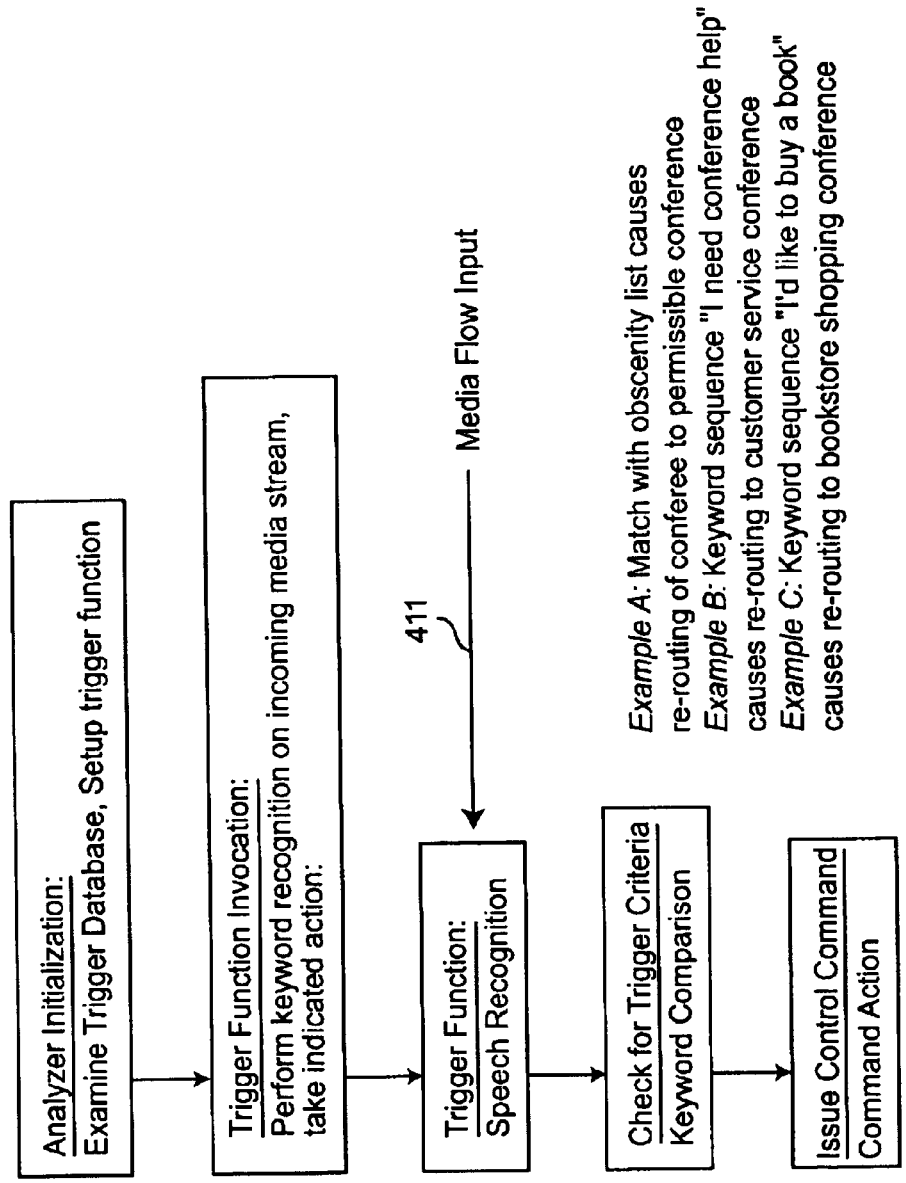
FIG. 4 shows an example of the operational flow of a bridge analyzer according to the present invention, utilizing speech recognition and keyword trigger criteria.
Figure 5:
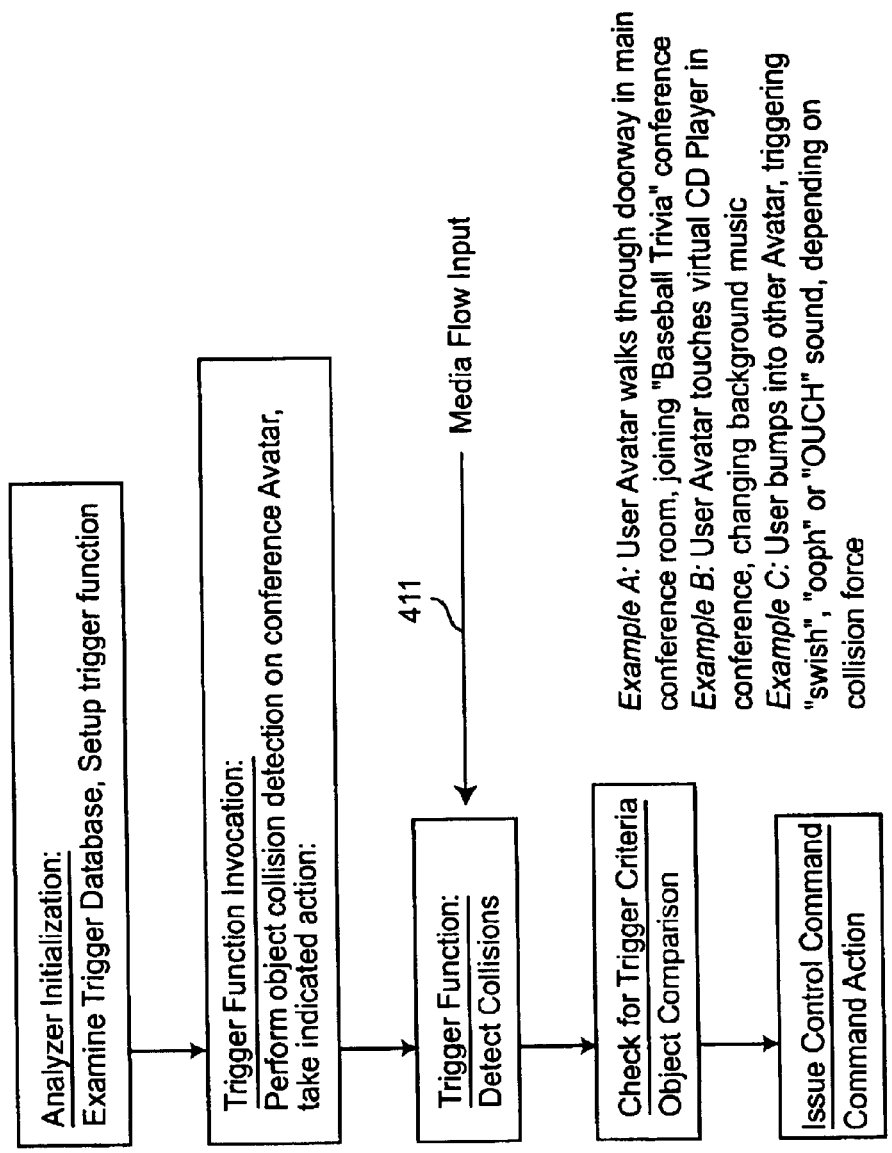
FIG. 5 shows an example of the operational flow of a bridge analyzer according to the present invention, utilizing collision detection and collision triggers.
Figure 6:
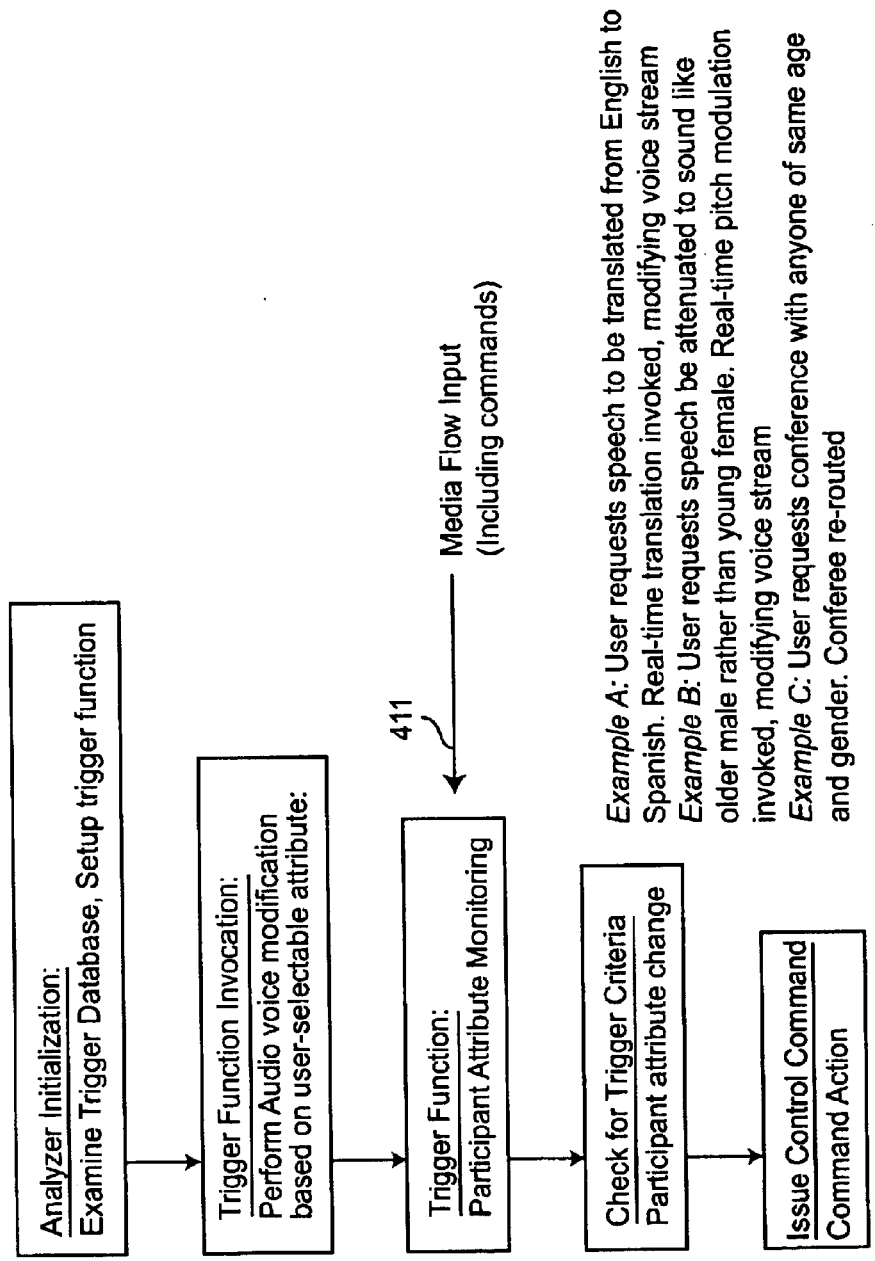
FIG. 6 shows an example of the operational flow of a bridge analyzer according to the present invention, utilizing attribute monitoring and attribute triggers.

Examples of sample trigger functions and their corresponding tests are shown in FIGS. 4–6, with reference back to the automatic bridge controller functions shown in FIG. 3. Each participant may have a configuration profile which allows custom application of bridge analyzer functions, or applies only a subset of functions to that participant's media flow. These configuration files may be stored in a central repository, or encrypted and stored on the participant client device. In each case, the participant profile is communicated at the initiation of a session to the corresponding automatic bridge controller, and is temporarily linked via the trigger definition database to participant option field settings, allowing testing of particular functions for each participant.

Figure 2:
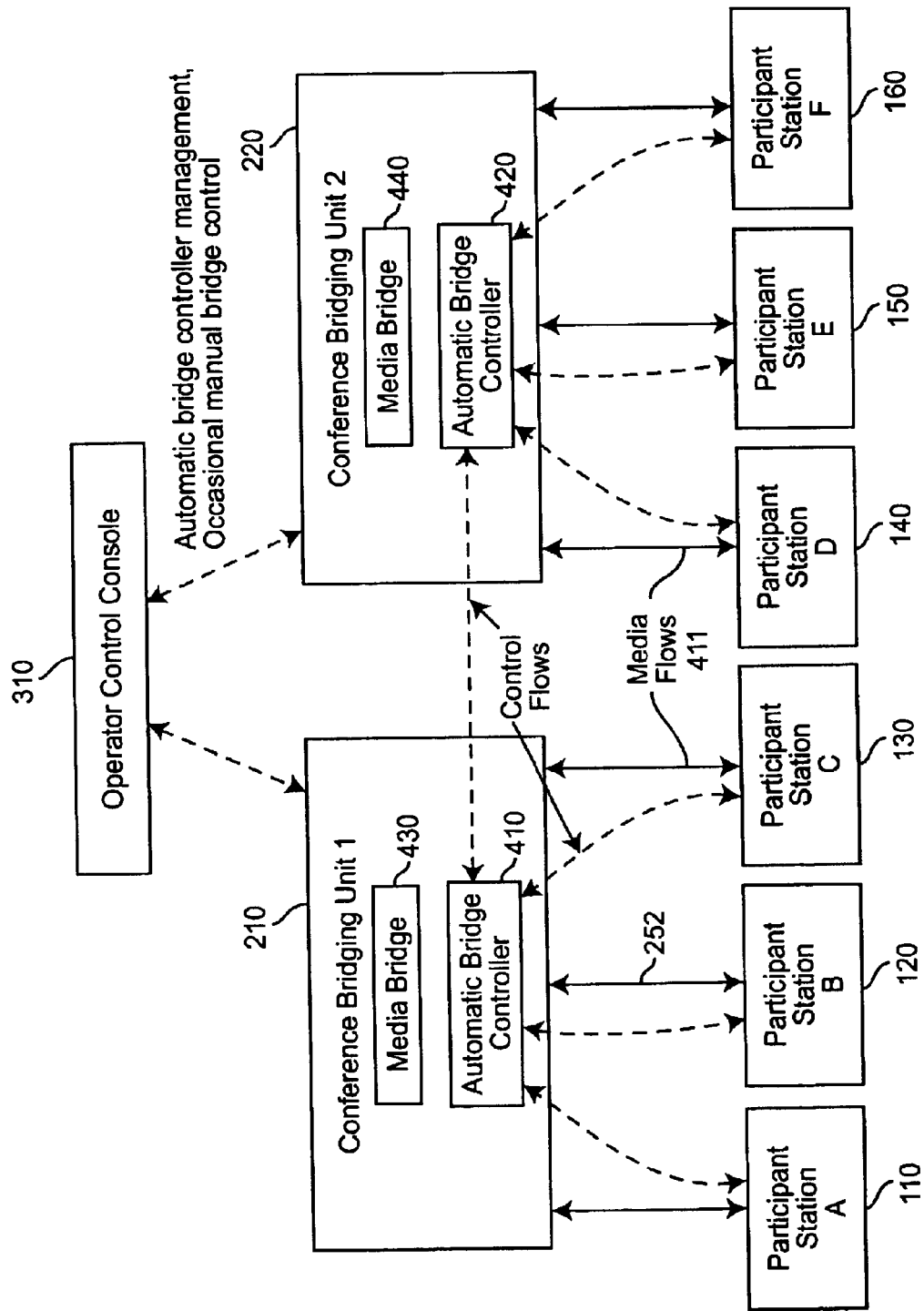
FIG. 2 shows a block diagram of an automatic multiple bridge conferencing environment, with communications endpoints, media flows, conference bridging units, an operator control console, automatic bridge controllers, and automatic bridge controller control flows.

The bridge control protocol 414 is used to communicate commands to various system components. The type and nature of these commands will change as the functions required by the bridge analyzer change. In general, the protocol comprises operation codes and data for execution commands on the appropriate network element. For instance if a participant (e.g. Participant B in FIG. 2) needs to be re-routed to a new conference bridge, this information will be conveyed via the bridge control protocol 414 to the old conference bridging unit (e.g. 210 in FIG. 2), the new conference bridging unit (e.g. 220 in FIG. 2), and the participant's client (e.g. 120 in FIG. 2), allowing re-connection of the participant station's media flow (e.g. 252 in FIG. 2) to the new conference bridging unit, as well as execution of appropriate participant interface actions such as rerouting the participant station to a new conference. Rerouting may involve, for example, the bridge analyzer 412 sending trigger control commands to its associated media bridge 410 to disconnect participant station B 120; to automatic bridge controller 420 to accept media from participant station B 120 through its associated media bridge 440; and to participant station B 120, instructing participant station B 120 now to send its packets to conference bridging unit 220.

Examples of functions operable through the bridge analyzer 413 are shown in FIGS. 4 through 6. FIG. 4 shows an example operational flow for the automatic bridge controller 410. In this example, the trigger function to be performed on participant media flow 411 is speech recognition. The bridge controller 410 will pass media flow 411 to a speech recognition function, which may be implemented with, for example, IBM's ViaVoice technology as part of bridge analyzer 412. It may be advantageous in terms of efficient use of available resources across the system to distribute performance of this speech recognition function to the participant station (e.g., participant B 120 in FIG. 1) rather than execute the function at the automatic bridge controller 410. When words or sentences are extracted, they are tested against trigger criteria. In example A, the trigger criteria are a list of obscene or age-inappropriate words. The trigger control commands in this example comprise allowing the user to be redirected to an appropriate conference, sent to customer service, or notified and deleted from the conference, depending on the configuration of the trigger database and/or that participant station's profile.

In example B, the trigger criteria are various user help request phrases. When these phrases are matched, the bridge analyzer 412 issues trigger control commands to cause routing of the participant to the appropriate help desk. In example C, e-commerce related routing may occur, allowing context-sensitive or command-driven analysis to link the user with the appropriate new conference. The control commands are preferably communicated via the bridge control protocol 414, and may include, inter alia, the variety of information described in connection with FIGS. 3 and 9.

FIG. 5 shows another example operational flow for the automatic bridge controller 410. In this example, the trigger function to be performed on media flow 411 from the various participant stations is collision detection. To initialize this trigger function for handling by the bridge analyzer 412, appropriate entries are made in trigger definition database 413, either at system configuration or at a later time when the trigger function is identified to bridge analyzer 412 by a participant station (through its profile or directly). Collision detection is usually associated with objects in virtual two- or three-dimensional spaces, and entails a topological analysis of near proximity objects to determine if they have intersected or collided. In this example, the participants (e.g., A, B, C, etc. are represented in a virtual conference world by avatars, and the media flow 411 from the participant stations may include avatar-positional information and object data. The avatar-positional information and/or object data is tested by the collision-detection function to determine whether trigger criteria have been satisfied. In this example, trigger criteria may include the intersection of an avatar with another avatar or an object within the virtual conference world. It may also include the duration of that intersection and/or the speed with which the avatar moved into that intersection. If the trigger criteria are satisfied, then the appropriate control command(s) in the trigger definition database 413 is/are issued to the appropriate device(s) via control protocol 414. It will be observed that the collision detection function performed by the bridge analyzer 412 could be implemented in the participant station, as described for another example below in FIG. 8. In this case the positional information for other relevant avatars and objects is communicated to the participant station (such as through the media bridge 430) and only the result of the collision detection is conveyed via the control protocol 414.

In example A of FIG. 5, the participant walks into or "collides" with a virtual door object that has been labeled on the participant station's screen to indicate entry to a Baseball Trivia conference, after which the participant station is re-routed to the appropriate conference The control commands can also cause an audible event to occur. For example, in example B, the participant station's virtual or avatar hand touches a selection option on a virtual CD player in a conference, changing selected background music. In example C, the participant station's motion in the virtual conference room is checked for collisions with other objects or conferees, causing an appropriate audio event to be triggered. For example, if the participant's avatar just barely brushes against an object, it may trigger an audio event, such as a "swish" sound at the participant station. A collision of greater force, alternatively, may trigger a different audio event, such as an "ooph" or "ouch" sound. In all instances, the insertion of an audio event is preferably enabled via Edgepoint mixing, as described in related patent application Ser. No. 09/571,577 for Teleconferencing Bridge with Edgepoint Mixing, filed May 15, 2000. The control command could also be sent via the control protocol to the participant station directly for automatic generation locally.

FIG. 6 shows an additional type of operational flow that can be handled by the automatic bridge controller 400. In the examples shown in FIG. 6, the trigger function to be performed on user media 411 is selected by the participant. This selection may occur, for example, by direct command or via speech recognition of commands, as previously described in connection with FIG. 4, or via the control protocol 411, after detection of the speech pattern in the user interface of the participant station. In example A, the participant has indicated selection of language translation. Language translation is a processing intense application, involving speech recognition, contextual analysis, and language translation. In this event, the trigger control commands may comprise instructions internal to the bridge analyzer to translate the participant's incoming or outgoing speech into a different language. This serves to demonstrate additional example complexity, due to the fact that a network element capable of performing language translation would likely have to be temporarily assigned to the corresponding automatic bridge control unit and additional participant fees determined and assessed. Because of resource constraints, this language translation function may be selectively assigned (i.e. performed on incoming or outgoing streams for particular participant stations), depending on the nature of each participant station's requirements and selections as recorded in a participant's profile.

Example B indicates the participant has selected modification of his/her voice in a voice conference (or analogously, modification of video or imagery in a video conference), according to certain conditions and requirements. For example, a young female may wish to disguise her gender and age to some extent, invoking a modification function on her voice, in effect modifying the apparent frequency and pitch of her voice stream within her media stream. This might be selectively enabled, presenting different apparent voices from her to different participant stations. In example C, the participant has requested re-routing based on participant attributes, such as age and gender. In the example, the participant would be directed to a conference which included other participants having the same or similar attributes.

Figure 7:
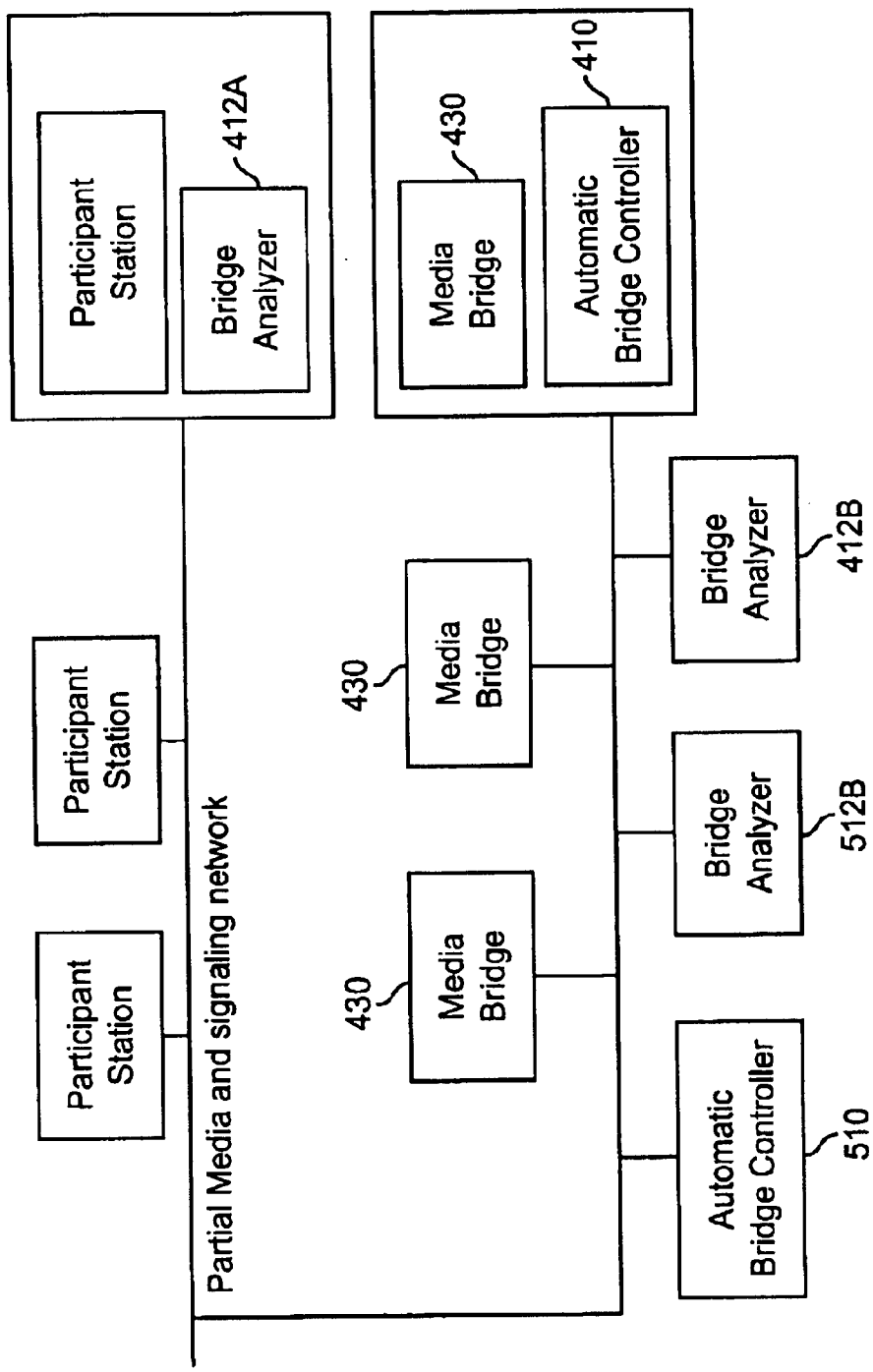
FIG. 7 shows a distributed automatic bridge controller environment, with communications endpoints, conference bridges, and with automatic bridge controllers located both within the conference bridge and externally, and with bridge analyzers located both within an automatic bridge controller and externally, including embedded within the communications endpoint client and independently on the network.

FIG. 7 presents a sample distributed automatic bridge controller network environment. It is similar to FIG. 2, with the addition of a more distributed model for the controllers and their bridge analyzer functions. As indicated in FIG. 7, multiple participant stations may be associated with one or more automatic bridge controllers. The automatic bridge controller 410 may be identical to the one described in FIG. 2. In contrast, automatic bridge controller 510 is not directly associated with a media bridge 430, allowing it to be implemented as an independent network resource, and hence flexibly assigned to participant stations and media flows as needed. In some situations, such as voice stream media flows, these external automatic bridge controllers 510 are preferably capable of independently accessing the media flows, by methods such as sharing an application port number in a packet network. The participant station may also be expanded to include all or a portion of the automatic bridge controller functionality, as shown in 412-A, where the bridge analyzer 412-A executes locally. For example, if the speech recognition application described in FIG. 4 can be executed with extra cycles of the local participant station, it may be advantageous to distribute that particular function. Similarly, bridge analyzer 412-B may implement a specialized function associated with a controller embedded in a conference bridging unit 410, but on an independent network unit. Analogously, analyzer 512-B may implement one or more analyzer functions associated with independent controller unit 510. All of the elements illustrated in FIG. 7 can be connected across any suitable network, including a wide area network, a local area network, a packet-switched network, a cellular network, a PCS network, etc.

Figure 8:
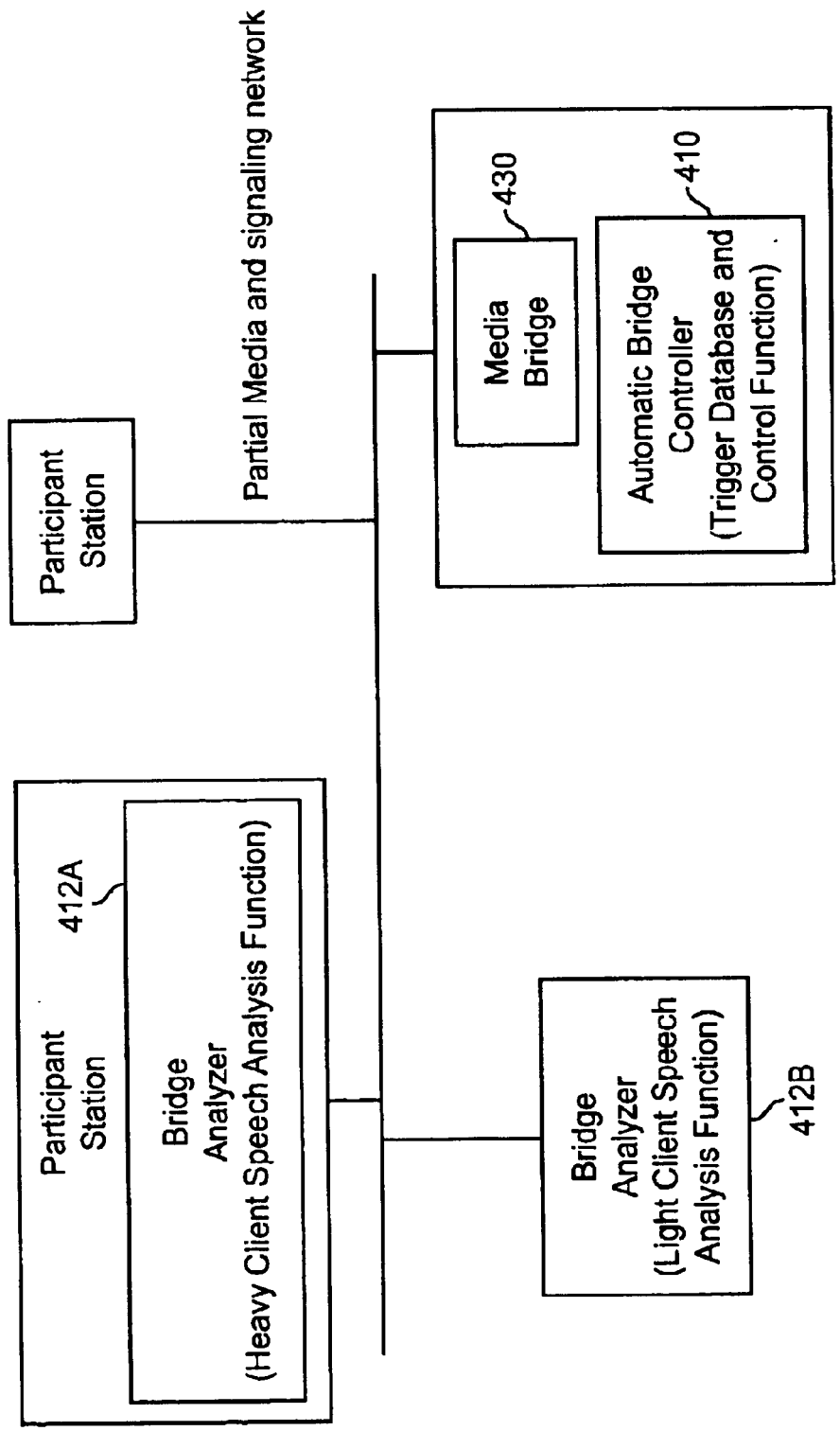
FIG. 8 shows an example of distributed bridge analyzer functionality, with communications endpoints, a conference bridge, and with bridge analyzer functions distributed both within a communications endpoint and independently on the network.

FIG. 8 presents a sample distributed bridge analyzer in more detail, demonstrating a situation where it is advantageous to employ multiple distributed components. Two participant stations are shown. One consists of a "heavy" (i.e. processing capable) participant station that has enough excess capacity to implement the speech recognition bridge analyzer function 412-A described in FIG. 4, and discussed further above in FIG. 7. In contrast, the other participant station is "light," or does not have extra processing capability, and must have its associated speech recognition function executed in a separate bridge analyzer. In the example, the bridge analyzer is an independent unit 412-B. In this example, both participant stations are still coordinated by the same master automatic bridge controller 410, which contains the trigger database and executes the control protocol. In this case, the two bridge analyzers serve as proxies for the controller's analyzer functions. Communication between the controller 410 and the distributed analyzers 412-A, 412-B occurs via a function-specific protocol, which in this case communicates information such as the trigger functions and trigger criteria to the analyzers, and the match list back from the analyzer to the controller.

Other distributed combinations of the various elements described herein for the example or other functions would be similarly considered obvious to those reasonably practiced in the art of distributed network design. Similarly, the inherent scalability of bridge controllers in general and the bridge analyzers in particular will be apparent to those practiced in the art, due to the modular nature of distributed networking. The optimal combination of central and distributed resources can vary depending on a particular network architecture, and may include considerations of bandwidth, operational support, flexibility, redundancy, and other design criteria applicable to a network.

Figure 9:
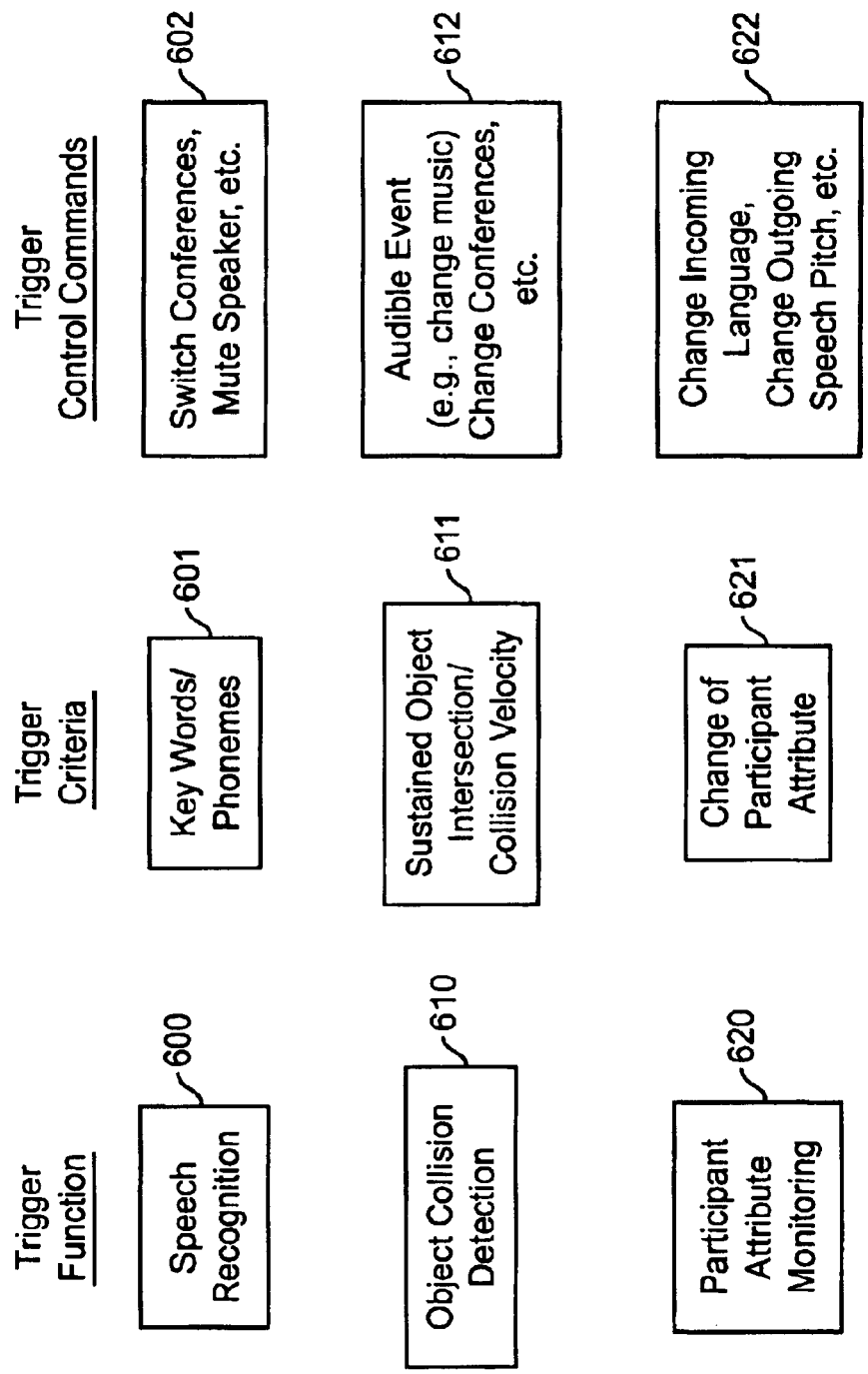
FIG. 9 is a matrix display of example sets of trigger functions, trigger criteria and trigger control commands contained in a trigger definition database in accordance with the present invention.

FIG. 9 illustrates an exemplary embodiment of a trigger definition database 413. It will be recognized that trigger database 413 may take many forms and may be distributed in any number of ways across a control network. In the exemplary embodiment shown in FIG. 9, each trigger function is associated with trigger criteria and trigger control commands. For example, the first trigger function is speech recognition 600. If a participant station (or the automatic bridge controller) enables the speech-recognition function, the bridge analyzer 412 analyzes the media flows from the participants and searches for trigger criteria in the form of key words (or phonemes) 601. When those key words are detected, the bridge analyzer issues appropriate trigger control command(s) 602. In this example, the trigger control command may include switching a participant station to a different conference, muting a particular participant station from the input to another participant station's media flow, or any other appropriate commands depending on the particular algorithm employed. Similarly, other trigger functions such as object collision detection 610 (with associated trigger criteria 611 and trigger control commands 612) and participant attribute monitoring 620 (with associated trigger criteria 621 and trigger control commands 622) can be effected by the bridge analyzer 412. These have been discussed in greater detail in relation to FIGS. 4–6.

The trigger criteria and trigger control commands associated with a particular trigger function may be set or altered dynamically in accordance with the present invention either centrally and/or at the participant stations (e.g., 110). Moreover, not all trigger functions are necessarily enabled for all participant stations. For example, each participant station preferably enters participant profile information when it first establishes a connection to the conference bridging unit 410, 420. This participant profile information may include personal participant information (e.g., gender, age, location, etc.), specific trigger criteria (e.g., scan for conversations mentioning the word "sports"), trigger function enable/disable preferences (e.g., enable parental control function filtering out age-inappropriate language), etc. This participant profile information can be manually entered, stored by the participant station from a previous conference and resent to the conference bridging unit, and/or stored at the conference bridging unit or elsewhere. In each case, the participant profile is preferably communicated at the initiation of a session to the corresponding automatic bridge controller, and is temporarily linked via the trigger definition database to participant option field settings, allowing testing of particular functions for each participant.

The participant profile information can then be used to adapt the trigger definition database to the particular needs of that participant station. Alternatively, the media flow from each participant station may include explicit commands to the bridge analyzer to enable certain functions or change trigger criteria or trigger control commands. In another embodiment, the system may set the trigger functions, criteria, and control commands. For example, in a conference dedicated to the discussion of children's books, the present system may automatically disconnect from the conference any user who utters a vulgarity.

For example, a participant who is a young girl may choose (or her parents may choose) to enable the speech recognition function, including trigger criteria comprising a set of offensive words, and including a control command that mutes the offensive speaker from the young girl's input audio stream. An adult participant, alternatively, may disable the speech recognition function or use it differently. For example, an adult looking for a conversation about sports, may enable the speech recognition function, including trigger criteria comprising a few sports terms, and a trigger control command to connect him/her to that conversation. In a virtual chat room environment, such as described in related U.S. application Ser. No. 09/571,577, entitled "Teleconference Bridge with Edgepoint Mixing," filed May 15, 2000, previously incorporated by reference herein, this may comprise repositioning that participant's avatar near the conversation of interest. In another embodiment, this function may include monitoring media streams from participants connected to other conference bridging units and rerouting the participant station to that conference bridging unit if a conversation of interest is found.

While the invention has been described in terms of a single preferred embodiment, those skilled in the art will recognize that the invention can be practiced with modification within the spirit and scope of the appended claims.

Having thus described our invention, what we claim as new and desire to secure by letters patent is as follows:

1. A system for automatically controlling a teleconference, comprising:
   means for establishing a trigger definition database in accordance with participant configuration profiles, there being a participant configuration profile for each of a plurality of endpoints connected to said teleconference through a media bridge;
   means for identifying trigger criteria defined in said trigger definition database, said identifying means further comprising
   means for analyzing media flows, and
   means for extracting direct commands from said media flows, said media flows originating from an endpoint for distribution through said media bridge to other endpoints on said teleconference;
   means for generating conference control commands, in accordance with said trigger definition database, when said trigger criteria are identified by said analysis or said direct commands.

2. The system of claim 1, wherein said analyzing means is a bridge analyzer.

3. The system claim 2, wherein said bridge analyzer is located within an automatic bridge controller on a network.

4. The method of claim 2, wherein said bridge analyzer is located in part at an automatic bridge controller and in part at an endpoint, in accordance with design criteria for operation of a network of one or more of said teleconferences.

5. The method of claim 4, wherein said trigger criteria include speech recognition of media flow from an endpoint and wherein said conference control commands include switching said endpoint to another teleconference on said network.

6. The system of claim 1, wherein said trigger criteria include collision detection and wherein said conference control commands include changing background music at an endpoint responsive to said collision detection.

7. The system of claim 1, wherein said trigger criteria include participant attribute change and wherein said conference control commands include invoking real time translation of media flows distributed to said participant.

8. The system of claim 1, wherein said participant configuration profile is modifiable during said teleconference.

9. The system of claim 1, wherein said analyzing means further comprises:
   means for associating a media flow with an endpoint;
   means for using said trigger definition database to determine trigger criteria applicable to said endpoint;
   means for applying said determined trigger criteria to said media flow.

10. The system of claim 9, wherein said generating means further comprises:
   means for receiving an identification of trigger criteria from said analyzing means;
   means for using said trigger definition database to determine conference control commands applicable to said trigger criteria;
   means for issuing said conference control commands.

11. A method for automatically controlling a teleconference, comprising the steps of:
    establishing a trigger definition database in accordance with participant configuration profiles, there being a participant configuration profile for each of a plurality of endpoints connected to said teleconference through a media bridge,
    identifying trigger criteria defined in said trigger definition database, said identifying step further comprising the mutually exclusive steps of
    analyzing media flows, and
    extracting direct commands from said media flows, said media flows originating from an endpoint for distribution through said media bridge to other endpoints on said teleconference;
    generating conference control commands, in accordance with said trigger definition database, when said trigger criteria are identified by said analysis or said direct commands.

12. The method of claim 11, wherein said analyzing step is performed by a bridge analyzer.

13. The method of claim 12, wherein said bridge analyzer is located within an automatic bridge controller on a network.

14. The method of claim 12, wherein said bridge analyzer is located in part at an automatic bridge controller and in part at an endpoint, in accordance with design criteria for operation of a network of one or more of said teleconferences.

15. The method of claim 14, wherein said trigger criteria include speech recognition of media flow from an endpoint and wherein said conference control commands include switching said endpoint to another teleconference on said network.

16. The method of claim 11, wherein said trigger criteria include collision detection and wherein said conference control commands include changing background music at an endpoint responsive to said collision detection.

17. The method of claim 11, wherein said trigger criteria include participant attribute change and wherein said conference control commands include invoking real time translation of media flows distributed to said participant.

18. The method of claim 11, wherein said participant configuration profile is modifiable during said teleconference.

19. The method of claim 11, wherein said analyzing step further comprises the steps of:
    associating a media flow with an endpoint;
    using said trigger definition database to determine trigger criteria applicable to said endpoint;
    applying said determined trigger criteria to said media flow.

20. The method of claim 19, wherein said generating step further comprises the steps of:
    receiving an identification of trigger criteria from said analyzing step;
    using said trigger definition database to determine conference control commands applicable to said trigger criteria;
    issuing said conference control commands.

21. A system for automatically controlling a conference, wherein a plurality of participant stations, including at least a first participant station, are operatively connected by a media bridge, the system comprising:
    a trigger definition database, including trigger criteria and trigger control commands associated with trigger functions;
    at least a first bridge analyzer, operatively connected to the trigger definition database and the media bridge, adapted to:
    analyze media flow from at least the first participant station to the media bridge;
    extract direct commands from said media flow, said analysis and said extraction being mutually exclusive:
    implement at least a first of the trigger functions identified in the trigger database;
    identify whether at least a first of the trigger criteria for the first trigger function are satisfied by said analysis of the media flow; and
    generate at least a first control command when the first trigger criteria is satisfied.

22. The system of claim 21, wherein at least part of the first bridge analyzer is located within an automatic bridge controller on a network.

23. The system of claim 21, wherein the first bridge analyzer is located in part at an automatic bridge controller and in part at one of the plurality of participant stations.

24. The system of claim 23, wherein the first trigger function includes speech recognition and the trigger criteria include key words in the media flow from a second of the participant stations and wherein said conference control commands include switching the first participant station to another teleconference on said network.

25. The system of claim 23, wherein the first trigger function includes speech recognition and the trigger criteria include key words in the media flow from the first participant station and wherein the conference control commands include switching the first participant station to another teleconference on the network.

26. The system of claim 21, wherein said first trigger function includes collision detection, the trigger criteria include intersection of objects, and wherein the control commands include causing an audible event at the first participant station responsive to said collision detection.

27. The system of claim 26, wherein the audible event is a change in conference background music at the first participant station.

28. The system of claim 21, wherein the first trigger function includes attribute monitoring, the trigger criteria include participant attribute change and wherein said conference control commands include invoking real time translation of media flows distributed to the first participant station.

29. The system of claim 21, wherein the trigger database includes at least a first profile for at least the first participant station and the first profile is modifiable during the conference.

30. The system of claim 21, further comprising a second bridge analyzer, operatively connected to the media bridge and the trigger database.

31. The system of claim 30, wherein the first bridge analyzer is located on an automatic bridge controller on a network and the second bridge analyzer is locate on the first participant station.

32. A method for automatically controlling a conference, wherein a plurality of participant stations, including at least a first participant station, are operatively connected by a media bridge and the media bridge is operatively connected to a trigger definition database, including trigger criteria and trigger control commands associated with trigger functions, the method comprising the steps of:
    analyzing media flow from at least the first participant station to the media bridge;

extracting direct commands from said media flow, said analyzing step and said extracting step being mutually exclusive;

implementing at least a first of the trigger functions identified in the trigger database;

identifying whether at least a first of the trigger criteria for the first trigger function are satisfied by said analysis of the media flow; and generating at least a first control command when the first trigger criteria is satisfied.

33. The method of claim 32, wherein the first trigger function includes speech recognition and the trigger criteria include key words in the media flow from a second of the participant stations and wherein said conference control commands include switching the first participant station to another conference.

34. The method of claim 32, wherein the first trigger function includes speech recognition and the trigger criteria include key words in the media flow from the first participant station and wherein the conference control commands include switching the first participant station to another teleconference.

35. The method of claim 32, wherein said first trigger function includes collision detection, the trigger criteria include intersection of objects, and wherein the control commands include causing an audible event at the first participant station responsive to said collision detection.

36. The method of claim 35, wherein the audible event is a change in conference background music at the first participant station.

37. The method of claim 32, wherein the first trigger function includes attribute monitoring, the trigger criteria include participant attribute change and wherein said conference control commands include invoking real time translation of media flows distributed to the first participant station.

38. The method of claim 31, wherein the trigger database includes at least a first profile for at least the first participant station and the first profile is modifiable during the conference.

39. A computer-readable medium containing instructions for controlling a computer system to facilitate a conference process among a plurality of participant stations, including at least a first participant station, wherein the participant stations are operatively connected to a media bridge and the media bridge is operatively connected to a trigger definition database, including trigger criteria and trigger control commands associated with trigger functions, the process comprising:

analyzing media flow from at least the first participant station to the media bridge;

extracting direct commands from said media flow, said analyzing and said extracting step being mutually exclusive:

implementing at least a first of the trigger functions identified in the trigger database;

identifying whether at least a first of the trigger criteria for the first trigger function are satisfied by said analysis of the media flow; and generating at least a first control command when the first trigger criteria is satisfied.

40. An automatic teleconferencing control system comprising:

a plurality of media conferencing bridges on a network, each said media bridge controlling a conference among a plurality of participant stations, each said participant station being connected to one of said media bridges at a time;

at least one automatic bridge controller, said automatic bridge controller further comprising a trigger definition database and a bridge analyzer;

wherein media flows are generated at a participant station and are communicated through said automatic bridge controller to other participant stations on said conference;

wherein said bridge analyzer identifies trigger criteria defined in said trigger definition database by analyzing said media flows and, extracting direct commands from said media flows; and wherein said automatic bridge controller uses said trigger definition database to control said media flow in accordance with participant configuration profiles at each said participant station.

* * * * *